US012746424B2

(12) United States Patent
Veach

(10) Patent No.: US 12,746,424 B2
(45) Date of Patent: Sep. 29, 2026

(54) FIREFIGHTER TRAINING ASSEMBLY

(71) Applicant: Kyle Veach, Hawesville, KY (US)

(72) Inventor: Kyle Veach, Hawesville, KY (US)

( * ) Notice: Subject to any disclaimer, the term of this patent is extended or adjusted under 35 U.S.C. 154(b) by 691 days.

(21) Appl. No.: 18/128,621

(22) Filed: Mar. 30, 2023

(65) Prior Publication Data

US 2024/0325811 A1 Oct. 3, 2024

(51) Int. Cl.
*A62C 99/00* (2010.01)

(52) U.S. Cl.
CPC ................................ *A62C 99/0081* (2013.01)

(58) Field of Classification Search
CPC .................................................. A62C 99/0081
USPC .......................................................... 434/226
See application file for complete search history.

(56) References Cited

U.S. PATENT DOCUMENTS 4,526,548 A 7/1985 Livingston
5,105,493 A * 4/1992 Lugtenaar ................ B25G 3/14 7/116
5,374,191 A 12/1994 Herman
7,416,412 B2 8/2008 Segrest
10,083,623 B2 9/2018 King
10,245,455 B2 4/2019 Mullins
2004/0127292 A1* 7/2004 Chan .................... A63H 33/009 463/47.2
2010/0180400 A1* 7/2010 Pell ........................ A61B 90/94 16/110.1

FOREIGN PATENT DOCUMENTS

WO WO2011015562 2/2011

OTHER PUBLICATIONS

Firefighter Hand Tools. Website [online]. All Hands Fire Equipment, Archive.org capture from Oct. 16, 2021 [retrieved on Oct. 24, 2025]. Retrieved from the Internet: <URL: https://web.archive.org/web/20211016061214/https://www.allhandsfire.com/Categories/Tools-Equipment/Fire-Tools>. (Year: 2021).*

* cited by examiner

*Primary Examiner* — Peter S Vasat
*Assistant Examiner* — Stephen Alvesteffer

(57) ABSTRACT

A firefighter training assembly includes a plurality of firefighting tools which each has a handle and a head. The head associated with each of the plurality of firefighting tools has a unique structure with respect to each other. Each of the plurality of firefighting tools includes an outer layer comprised of a lightweight material for wielding the firefighting tools in a training environment. Each of the firefighting tools includes a central core comprised of a weighted material to simulate the weight of genuine firefighting tools in the training environment.

14 Claims, 4 Drawing Sheets

FIREFIGHTER TRAINING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to firefighter devices and more particularly pertains to a new firefighter device for facilitating firefighting trainees to wield realistic replicas of firefighting tools in a training environment. The device includes a plurality of firefighting tools that each comprises a resilient and lightweight outer layer and a central core comprising a weighted material.

(2) Description of Related Art Including Information Disclosed Under 37 CFR 1.97 and 1.98

The prior art relates to firefighter devices including a mobile firefighter training trailer that includes mockups of rooms with furniture. The prior art discloses a firefighter training device that includes a live fire generator. The prior art discloses a firefighter training sled that simulates breaching of a ceiling. The prior art discloses a firefighter training fixture that includes a cart and a ceiling frame elevated over the cart.

BRIEF SUMMARY OF THE INVENTION

An embodiment of the disclosure meets the needs presented above by generally comprising a plurality of firefighting tools which each has a handle and a head. The head associated with each of the plurality of firefighting tools has a unique structure with respect to each other. Each of the plurality of firefighting tools includes an outer layer comprised of a lightweight material for wielding the firefighting tools in a training environment. Each of the firefighting tools includes a central core comprised of a weighted material to simulate the weight of genuine firefighting tools in the training environment.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
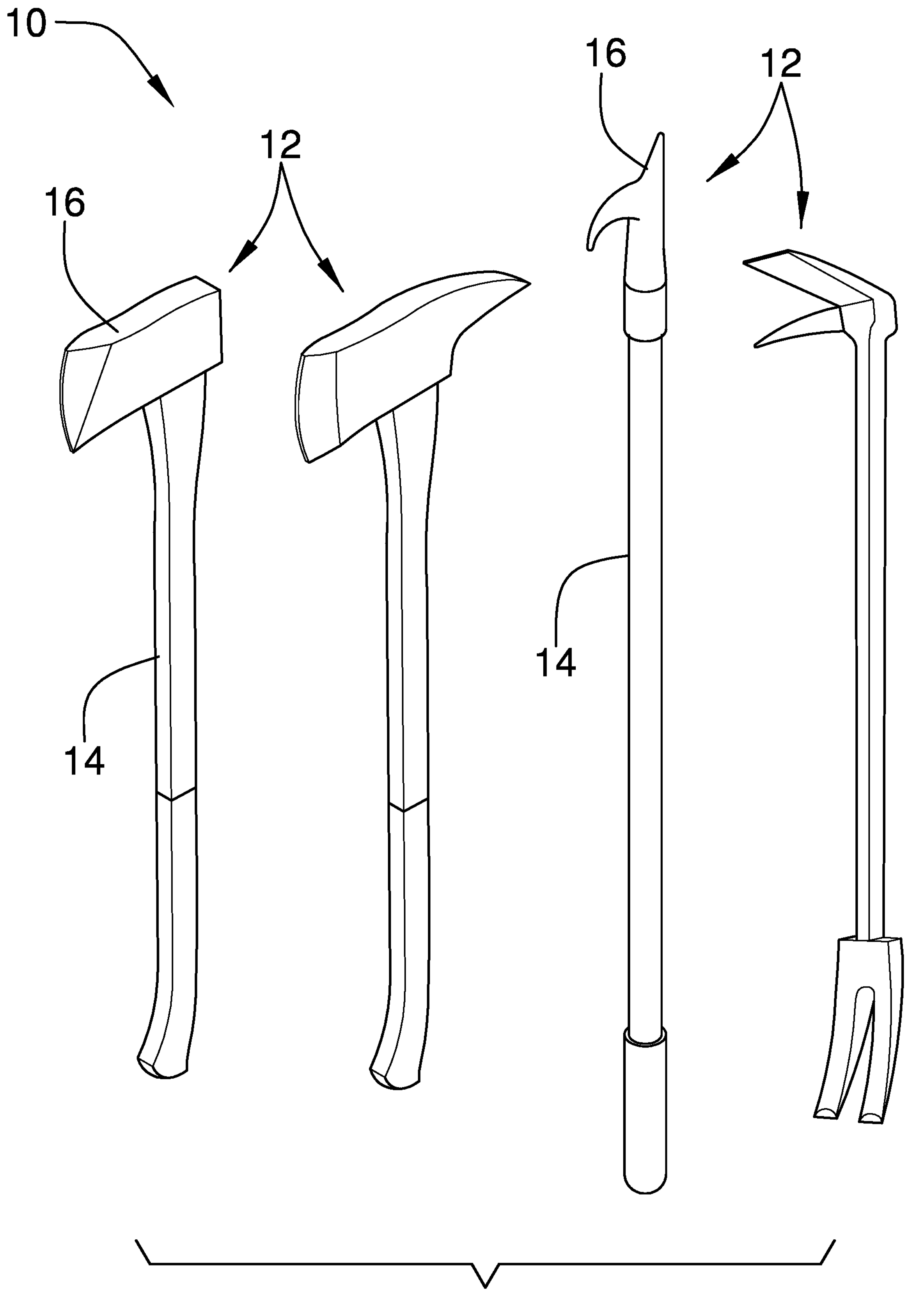
FIG. 1 is a perspective view of a firefighter training assembly according to an embodiment of the disclosure.
Figure 2:
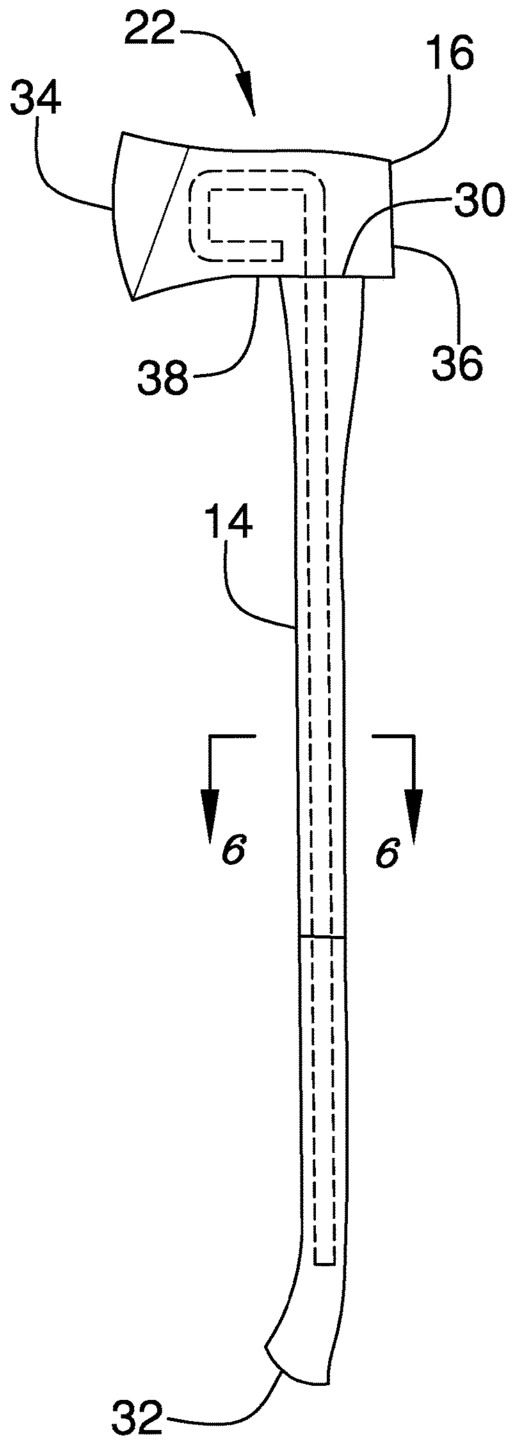
FIG. 2 is a phantom view of flathead axe of an embodiment of the disclosure.
Figure 3:
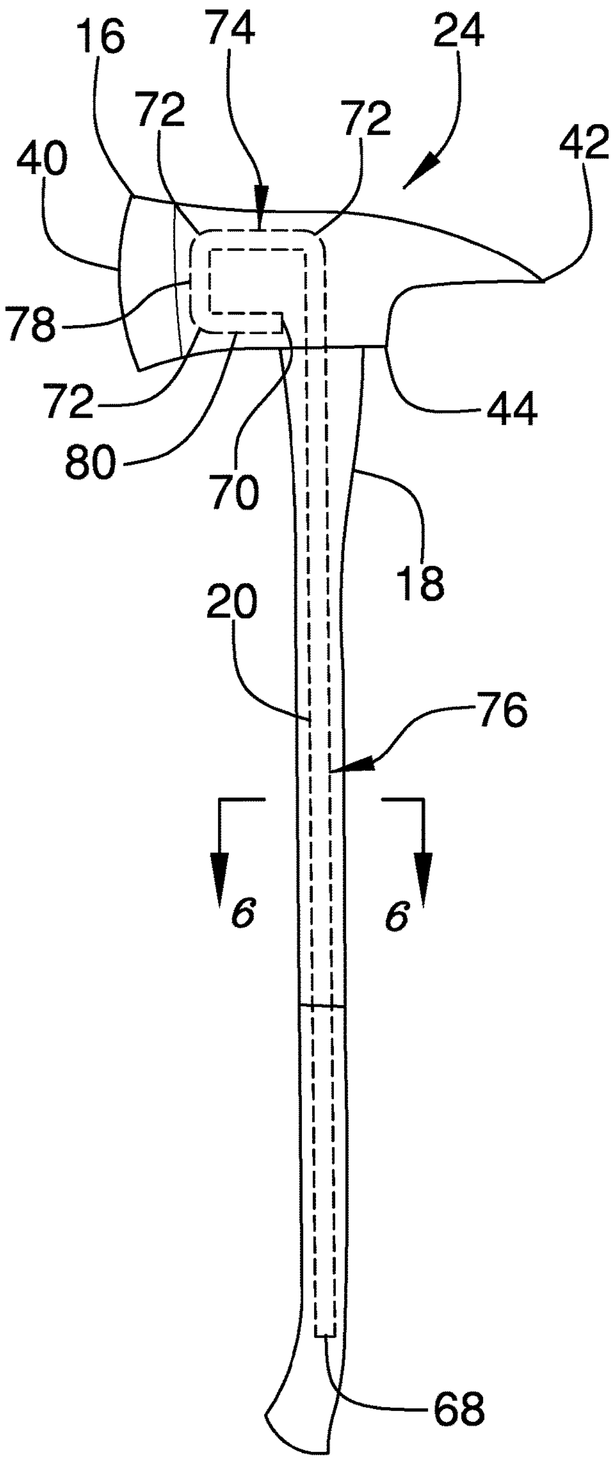
FIG. 3 is a phantom view of pick head axe of an embodiment of the disclosure.
Figure 4:
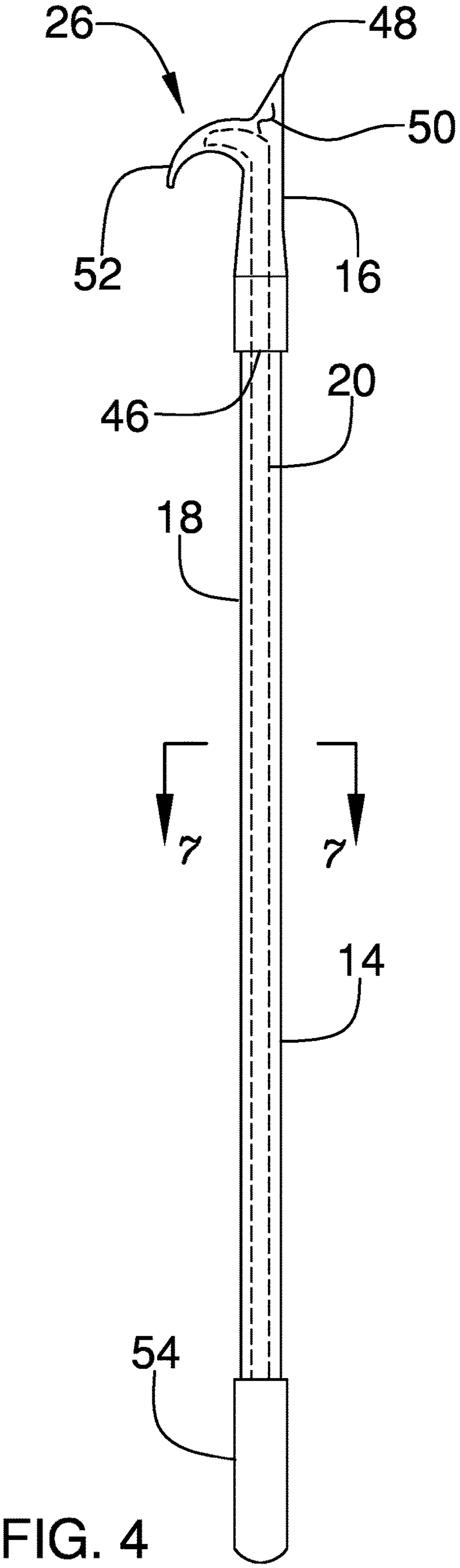
FIG. 4 is a phantom view of pike pole of an embodiment of the disclosure.
Figure 5:
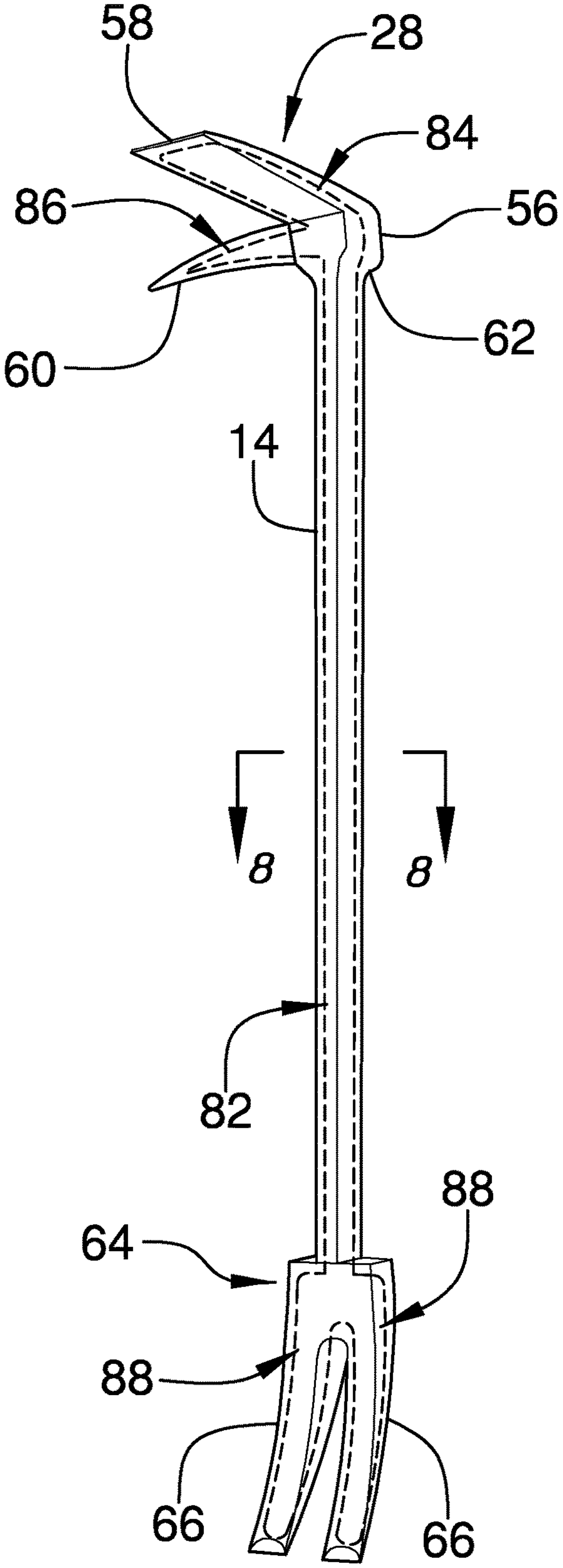
FIG. 5 is a phantom view of halligan bar of an embodiment of the disclosure.
Figure 6:
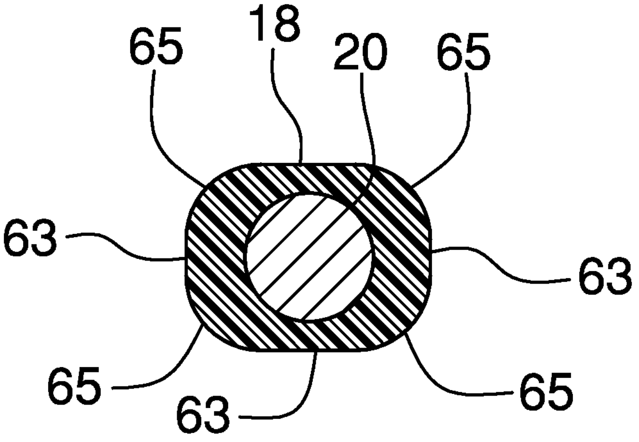
FIG. 6 is a cross sectional view taken along line 6-6 of FIGS. 2 and 3 of an embodiment of the disclosure.
Figure 7:
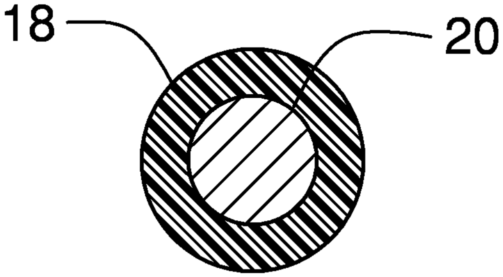
FIG. 7 is a cross sectional view taken along line 7-7 of FIG. 4 of an embodiment of the disclosure.
Figure 8:
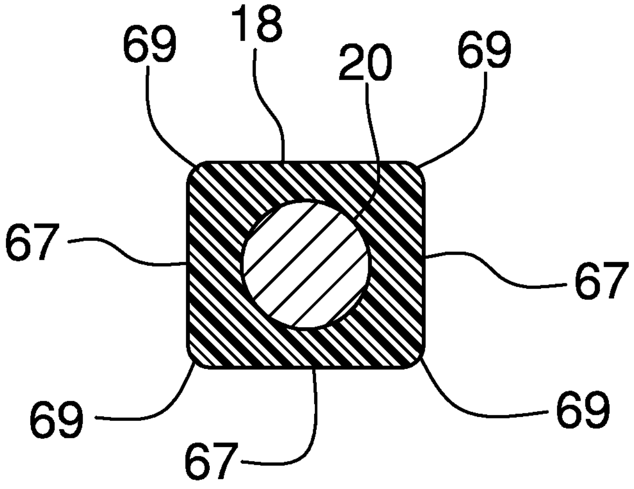
FIG. 8 is a cross sectional view taken along line 8-8 of FIG. 5 of an embodiment of the disclosure.

With reference now to the drawings, and in particular to FIGS. 1 through 8 thereof, a new firefighter device embodying the principles and concepts of an embodiment of the disclosure and generally designated by the reference numeral 10 will be described.

As best illustrated in FIGS. 1 through 8, the firefighter training assembly 10 generally comprises a plurality of firefighting tools 12 that each has a handle 14 and a head 16. The head 16 associated with each of the plurality of firefighting tools 12 has a unique structure with respect to each other. Furthermore, each of the plurality of firefighting tools 12 includes an outer layer 18 which is comprised of a lightweight material, including but not being limited to, polyvinylchloride, acrylonitrile butadiene styrene or other type of high impact plastic. In this way each of the plurality of firefighting tools 12 can be wielded in a training environment. Additionally, each of the firefighting tools 12 includes a central core 20 that is comprised of a weighted material, including but not being limited to steel or iron. In this way the plurality of firefighting tools 12 can simulate the weight of genuine firefighting tools 12 in the training environment. The outer layer 18 associated with each of the plurality of firefighting tools 12 is comprised of an impact resistant material to resist is damaged during training.

The plurality of firefighting tools 12 includes a flathead axe 22, a pick head axe 24, a pike pole 26 and a halligan bar 28 and the handle 14 associated with each of the plurality of firefighting tools 12 has a top end 30 and a bottom end 32. The handle 14 associated with each of the flathead axe 22 and a pick head axe 24 is flared adjacent to the top end 30 and the handle 14 associated with each of the flathead axe 22 and the pick head axe 24 is curved adjacent to the bottom end 32. The head 16 associated with the flathead axe 22 has a first end 34, a second end 36 and a bottom surface 38 extending between the first end 34 and the second end 36; the first end 34 tapers to an edge and the second end 36 is planar. Additionally, the top end 30 of the handle 14 associated with the flathead axe 22 is coupled to the bottom surface 38 of the head 16 associated with the flathead axe 22.

The head 16 associated with the pick head axe 24 has a primary end 40, a secondary end 42 and a lower surface 44 extending between the primary end 40 and the secondary end 42. The primary end 40 tapers to an edge and the lower surface 44 curves upwardly at the secondary end 42 such that the secondary end 42 tapers to a point. The top end 30 of the handle 14 associated with the pick head axe 24 is coupled to the lower surface 44 of the head 16 associated with the pick head axe 24.

The head 16 associated with the pike pole 26 has a lower end 46, an upper end 48 and an outer surface 50 extending between the lower end 46 and the upper end 48. The outer surface 50 tapers between the lower end 46 and the upper end 48 such that the upper end 48 tapers to a point. The outer surface 50 has a finger 52 curving downwardly toward the lower end 46 and the finger 52 is positioned closer to the upper end 48 than the lower end 46. The top end 30 of the handle 14 associated with the pike pole 26 is attached to the lower end 46 and the handle 14 associated with the pike pole 26 has a raised portion 54 extending from the bottom end 32 toward the top end 30.

The head 16 associated with the halligan bar 28 has a base 56 and an adze 58 that is perpendicularly oriented with the base 56. The head 16 associated with the halligan bar 28 has a pick 60 extending laterally away from the base 56 and the pick 60 is perpendicularly oriented with the adze 58. The top end 30 of the handle 14 associated with the halligan bar 28 is formed into a bottom end 62 of the base 56. Furthermore, the halligan bar 28 has a fork 64 that is disposed on the bottom end 32 of the handle 14 associated with the halligan bar 28. The fork 64 has a pair of curved tines 66 each extending away from the bottom end 32 of the handle 14 associated with the halligan bar 28. As is most clearly shown in FIG. 6, the handle 14 associated with each of the flathead axe 22 and the pick head axe 24 may having a plurality of intersecting sides 63 that intersect at rounded corners 65. As is most clearly shown in FIG. 7, the handle 14 associated with the pike pole 26 may be rounded about an axis extending between the top end 30 and the bottom end 32 of the handle 14 associated with the pike pole 26. As is most clearly shown in FIG. 8, the handle 14 associated with the halligan bar 28 may have a plurality of intersecting sides 67 that intersect at perpendicular corners 69.

The central core 20 associated with each of the flathead axe 22 and the pick head axe 24 has a lower end 68 and an upper end 70. Additionally, the central core 20 associated with each of the flathead axe 22 and the pick head axe 24 has a series of bends 72 that are spaced apart and distributed from an upper end 70 of the central core 20 toward the lower end 68 of the central core 20. The bends 72 define a first portion 74 perpendicularly oriented with a leg portion 76, a second portion 78 perpendicularly oriented with the first portion 74 and a third portion 80 perpendicularly oriented with the second portion 78; the upper end 70 of the central core 20 is directed toward the leg portion 76. Each of the first portion 74, the second portion 78 and the third portion 80 of the central core 20 associated with each of the flathead axe 22 and the pick head axe 24 is located within the head 16 associated with a respective of the flathead axe 22 and the pick head axe 24. Furthermore, the leg portion 76 of the central core 20 associated with each of the flathead axe 22 and the pick head axe 24 extends downwardly in the handle 14 associated with a respective one of the flathead axe 22 and the pick head axe 24. The central core 20 associated with the pike pole 26 extends along the handle 14 associated with the pike pole 26 and into the head 16 associated with the pike pole 26. Additionally, the central core 20 associated with the pike pole 26 curves into the finger 52 on the head 16 associated with the pike pole 26.

The central core 20 associated with the halligan bar 28 has a central section 82 which extends through the handle 14 associated with the halligan bar 28. Additionally, the central core 20 associated with the halligan bar 28 has an adze section 84 angling away from the central section 82 such that the adze section 84 extends into the adze 58 of the head 16 associated with the halligan bar 28. The central core 20 associated with the halligan bar 28 has a pick section 86 angling away from the central section 82 such that the pick section 86 extends into the pick 60 of the head 16 associated with the halligan bar 28. The central core 20 associated with the halligan bar 28 has a pair of fork sections 88 each distally positioned on the central section 82 when respect to the adze section 84. Additionally, each of the fork sections 88 extends into a respective one of the curved tines 66 of the fork 64 associated with the halligan bar 28.

In use, any of the plurality of firefighting tools 12 can be wielded in the training environment during firefighter training. The outer layer 18 of the firefighting tools 12 facilitates the firefighting tools 12 to be wielded during practice while doing minimal damage to the training environment. Additionally, the trainees are not exposed to potential carcinogens as can occur while training with firefighting equipment that has been employed in a fire. The central core 20 of the firefighting tools 12 enhances the realism of the employing the firefighting tools 12 in the training environment.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A firefighter training assembly which includes replicas of firefighting tools that can be employed in a training environment, said assembly comprising:

a plurality of firefighting tools, each of said plurality of firefighting tools having a handle and a head, said head associated with each of said plurality of firefighting tools having a unique structure with respect to each other, each of said plurality of firefighting tools including an outer layer, each of said firefighting tools including a central core being comprised of a weighted material wherein said plurality of firefighting tools is configured to simulate the weight of genuine firefighting tools in the training environment;

wherein said plurality of firefighting tools includes a flathead axe, a pick head axe, a pike pole and a halligan bar;

wherein said handle associated with each of said plurality of firefighting tools has a top end and a bottom end;

wherein said central core associated with each of said flathead axe and said pick head axe has a lower end and an upper end, said central core associated with each of said flathead axe and said pick head axe has a series of bends being spaced apart and distributed from an upper end of said central core toward a lower end of said central core, said bends defining a first portion being perpendicularly oriented with a leg portion and a second portion being perpendicularly oriented with said first portion and a third portion being perpendicularly oriented with said second portion having said upper end of said central core being directed toward said leg portion.

2. The assembly according to claim 1 wherein said handle associated with each of said flathead axe and a pick head axe is flared adjacent to said top end, said handle associated with each of said flathead axe and said pick head axe being curved adjacent to said bottom end.

3. The assembly according to claim 1, wherein said head associated with said flathead axe has a first end, a second end and a bottom surface extending between said first end and said second end, said first end tapering to an edge, said second end being planar, said top end of said handle associated with said flathead axe being coupled to said bottom surface of said head associated with said flathead axe.

4. The assembly according to claim 1, wherein said head associated with said pick head axe has a primary end, a secondary end and a lower surface extending between said primary end and said secondary end, said primary end tapering to an edge, said lower surface curving upwardly at said secondary end such that said secondary end tapers to a point, said top end of said handle associated with said pick head axe being coupled to said lower surface of said head associated with said pick head axe.

5. The assembly according to claim 1, wherein:

said head associated with said pike pole has a lower end, an upper end and an outer surface extending between said lower end and said upper end, said outer surface tapering between said lower end and said upper end such that said upper end tapers to a point;

said outer surface has a finger curving downwardly toward said lower end, said finger being positioned closer to said upper end than said lower end; and said top end of said handle associated with said pike pole is attached to said lower end.

6. The assembly according to claim 5, wherein said central core associated with said pike pole extends along said handle associated with said pike pole and into said head associated with said pike pole, said central core associated with said pike pole curving into said finger on said head associated with said pike pole.

7. The assembly according to claim 1, wherein said head associated with said halligan bar had a base and an adze being perpendicularly oriented with said base, said head associated with said halligan bar having a pick extending laterally away from said base, said pick being perpendicularly oriented with said adze, said top end of said handle associated with said halligan bar being formed into a bottom end of said base.

8. The assembly according to claim 1, wherein said halligan bar has a fork being disposed on said bottom end of said handle associated with said halligan bar, said fork having a pair of curved tines each extending away from said bottom end of said handle associated with said halligan bar.

9. The assembly according to claim 1, wherein said outer layer associated with each of said plurality of firefighting tools is comprised of an impact resistant material wherein each of said plurality of firefighting tools is configured to resist being damaged during training.

10. The assembly according to claim 1, wherein each of said first portion and said second portion and said third portion of said central core associated with each of said flathead axe and said pick head axe is located within said head associated with a respective of said flathead axe and said pick head axe.

11. The assembly according to claim 1, wherein said leg portion of said central core associated with each of said flathead axe and said pick head axe extends downwardly in said handle associated with a respective one of said flathead axe and said pick head axe.

12. The assembly according to claim 1, wherein:

said central core associated with said halligan bar has a central section extending through said handle associated with said halligan bar;

said central core associated with said halligan bar has an adze section angling away from said central section such that said adze section extends into said adze of said head associated with said halligan bar; and said central core associated with said halligan bar has a pick section angling away from said central section such that said pick section extends into said pick of said head associated with said halligan bar.

13. The assembly according to claim 12, wherein said central core associated with said halligan bar having a pair of fork sections each being distally positioned on said central section when respect to said adze section, each of said fork sections extending into a respective one of said curved tines of said fork associated with said halligan bar.

14. A firefighter training assembly which includes replicas of firefighting tools that can be employed in a training environment, said assembly comprising:

a plurality of firefighting tools, each of said plurality of firefighting tools having a handle and a head, said head associated with each of said plurality of firefighting tools having a unique structure with respect to each other, each of said plurality of firefighting tools including an outer layer, each of said firefighting tools including a central core being comprised of a weighted material wherein said plurality of firefighting tools is configured to simulate the weight of genuine firefighting tools in the training environment, said plurality of firefighting tools including a flathead axe, a pick head axe, a pike pole and a halligan bar, said handle associated with each of said plurality of firefighting tools having a top end and a bottom end, said handle associated with each of said flathead axe and a pick head axe being flared adjacent to said top end, said handle associated with each of said flathead axe and said pick head axe being curved adjacent to said bottom end, said head associated with said flathead axe having a first end, a second end and a bottom surface extending between said first end and said second end, said first end tapering to an edge, said second end being planar, said top end of said handle associated with said flathead axe being coupled to said bottom surface of said head associated with said flathead axe, said head associated with said pick head axe having a primary end, a secondary end and a lower surface extending between said primary end and said secondary end, said primary end tapering to an edge, said lower surface curving upwardly at said secondary end such that said secondary end tapers to a point, said top end of said handle associated with said pick head axe being coupled to said lower surface of said head associated with said pick head axe, said head associated with said pike pole having a lower end, an upper end and an outer surface extending between said lower end and said upper end, said outer surface tapering between said lower end and said upper end such that said upper end tapers to a point, said outer surface having a finger curving downwardly toward said lower end, said finger being positioned closer to said upper end than said lower end, said top end of said handle associated with said pike pole being attached to said lower end, said handle associated with said pike pole having a raised portion extending from said bottom end toward said top end, said head associated with said halligan bar having a base and an adze being perpendicularly oriented with said base, said head associated with said halligan bar having a pick extending laterally away from said base, said pick being perpendicularly oriented with said adze, said top end of said handle associated with said halligan bar being formed into a bottom end of said base, said halligan bar having a fork being disposed on said bottom end of said handle associated with said halligan bar, said fork having a pair of curved tines each extending away from said bottom end of said handle associated with said halligan bar;

wherein said outer layer associated with each of said plurality of firefighting tools is comprised of an impact resistant material wherein each of said plurality of firefighting tools is configured to resist being damaged during training;

wherein said central core associated with each of said flathead axe and said pick head axe has a lower end and an upper end, said central core associated with each of said flathead axe and said pick head axe has a series of bends being spaced apart and distributed from an upper end of said central core toward a lower end of said central core, said bends defining a first portion being perpendicularly oriented with a leg portion and a second portion being perpendicularly oriented with said first portion and a third portion being perpendicularly oriented with said second portion having said upper end of said central core being directed toward said leg portion, each of said first portion and said second portion and said third portion of said central core associated with each of said flathead axe and said pick head axe being located within said head associated with a respective of said flathead axe and said pick head axe, said leg portion of said central core associated with each of said flathead axe and said pick head axe extending downwardly in said handle associated with a respective one of said flathead axe and said pick head axe;

wherein said central core associated with said pike pole extends along said handle associated with said pike pole and into said head associated with said pike pole, said central core associated with said pike pole curving into said finger on said head associated with said pike pole; and wherein said central core associated with said halligan bar has a central section extending through said handle associated with said halligan bar, said central core associated with said halligan bar having an adze section angling away from said central section such that said adze section extends into said adze of said head associated with said halligan bar, said central core associated with said halligan bar having a pick section angling away from said central section such that said pick section extends into said pick of said head associated with said halligan bar, said central core associated with said halligan bar having a pair of fork sections each being distally positioned on said central section when respect to said adze section, each of said fork sections extending into a respective one of said curved tines of said fork associated with said halligan bar.

* * * * *